(12) United States Patent
Nakagawa et al.

(10) Patent No.: US 11,578,220 B2
(45) Date of Patent: *Feb. 14, 2023

(54) INK, INK ACCOMMODATING UNIT, PRINTING DEVICE AND PRINTING METHOD

(71) Applicant: RICOH COMPANY, LTD., Tokyo (JP)

(72) Inventors: Tomohiro Nakagawa, Kanagawa (JP); Hiroki Hagiwara, Kanagawa (JP); Yuutaroh Nonaka, Kanagawa (JP); Yuusuke Fujita, Tokyo (JP); Kazuhiko Umemura, Kanagawa (JP); Sei Yamamoto, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 104 days.

This patent is subject to a terminal disclaimer.

(21) Appl. No.: 17/198,357

(22) Filed: Mar. 11, 2021

(65) Prior Publication Data

US 2021/0292578 A1 Sep. 23, 2021

(30) Foreign Application Priority Data

Mar. 17, 2020 (JP) .............................. JP2020-046020

(51) Int. Cl.
*C09D 11/037* (2014.01)
*B41M 5/00* (2006.01)
(Continued)

(52) U.S. Cl.
CPC .............. *C09D 11/037* (2013.01); *B41J 2/01* (2013.01); *B41J 2/2107* (2013.01);
(Continued)

(58) Field of Classification Search
CPC ... C09D 11/326; C09D 11/033; C09D 11/324; C09D 11/38; C09D 11/36; C09D 11/322;
(Continued)

(56) References Cited

U.S. PATENT DOCUMENTS 11,186,737 B2 * 11/2021 Nakagawa ............. B41J 2/2107
2006/0205839 A1 * 9/2006 Noguchi .............. C09D 11/322
523/160
(Continued)

FOREIGN PATENT DOCUMENTS

JP 2016-108452 6/2016

*Primary Examiner* — Manish S Shah
(74) *Attorney, Agent, or Firm* — Grüneberg and Myers, PLLC

(57) ABSTRACT

An ink contains water, Pigment Red 269, a compound represented by the following Chemical formula (1), and at least one of a silicone compound and an acetylene glycol compound, where the proportion of the compound represented by the following Chemical formula (1) to the Pigment Red 269 is 2.0 percent by mass or less:

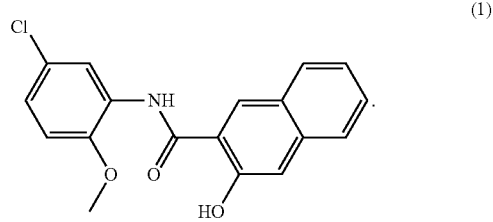

(1)

19 Claims, 1 Drawing Sheet

(51) Int. Cl.
*C09D 11/322* (2014.01)
*C09D 11/38* (2014.01)
*B41J 2/21* (2006.01)
*B41J 2/01* (2006.01)

(52) U.S. Cl.
CPC ......... *B41M 5/0023* (2013.01); *C09D 11/322* (2013.01); *C09D 11/38* (2013.01)

(58) Field of Classification Search
CPC ......... C09D 11/40; C09D 11/30; C09D 11/32; C09D 11/328; C09D 11/101; C09D 11/102; C09D 11/005; C09D 11/54; C09D 11/52; C09D 11/106; B41J 2/14; B41J 2202/01; B41J 25/001; B41J 25/34; B41J 25/003; B41J 2/21; B41J 25/312; B41J 2025/008; B41J 2202/21; B41J 2/17596; B41J 2/16508; B41J 2/1652; B41J 2/16538; B41J 2/175; B41J 2/17563; B41J 2/1433; B41J 2/1623; B41J 2202/00; B41J 2202/03; B41J 2/14201; B41J 2/045; B41J 11/0015; B41J 11/002; B41J 2/04581; B41J 2/055; B41J 2002/16502; B41J 2/04588; B41J 2/04595; B41J 2/04586; B41J 2/14274; B41J 2/01; B41J 2/211; B41J 2/17; B41J 2/17593; B41J 2/2107; B41J 2/1755; B41J 2/2114; B41J 2/2117; B41J 2/2056; B41J 2/0057; B41J 3/60; B41J 2002/012; B41J 2/04598; B41M 5/0023; B41M 5/00; B41M 5/0011; B41M 5/0017; B41M 5/0047; B41M 7/00; B41M 7/0072; B41M 5/52; B41M 5/5218; B41M 5/5227
See application file for complete search history.

(56) References Cited

U.S. PATENT DOCUMENTS

| | | | |
|---|---|---|---|
| 2012/0052256 A1* | 3/2012 | Nakamura | C09D 11/101 106/31.13 |
| 2012/0200653 A1* | 8/2012 | Shimohara | B41J 2/2107 524/530 |
| 2012/0213978 A1* | 8/2012 | Hironaka | C09D 11/30 347/102 |
| 2013/0027478 A1* | 1/2013 | Kozee | C09D 11/36 347/73 |
| 2013/0209695 A1* | 8/2013 | Fukagawa | C09D 163/00 523/400 |
| 2014/0313268 A1* | 10/2014 | Nakano | B41J 11/0015 524/88 |
| 2015/0132544 A1* | 5/2015 | Kano | C09D 11/101 106/31.13 |
| 2017/0121545 A1 | 5/2017 | Nagashima et al. | |
| 2017/0247561 A1 | 8/2017 | Nakagawa et al. | |
| 2019/0168516 A1 | 6/2019 | Nakagawa et al. | |
| 2019/0389231 A1 | 12/2019 | Kaji et al. | |
| 2020/0095444 A1 | 3/2020 | Hagiwara et al. | |
| 2020/0262228 A1 | 8/2020 | Hagiwara et al. | |
| 2020/0385592 A1 | 12/2020 | Nakagawa et al. | |
| 2020/0399496 A1 | 12/2020 | Nonaka et al. | |

* cited by examiner

INK, INK ACCOMMODATING UNIT, PRINTING DEVICE AND PRINTING METHOD

CROSS-REFERENCE TO RELATED APPLICATIONS

This patent application is based on and claims priority pursuant to 35 U.S.C. § 119 to Japanese Patent Application No. 2020-046020, filed on Mar. 17, 2020 in the Japan Patent Office, the entire disclosure of which is hereby incorporated by reference herein.

BACKGROUND

Technical Field

The present disclosure relates to an ink, an ink accommodating unit, a printing device, and a printing method.

Description of the Related Art

Since inkjet printing devices are relatively quiet, have low running costs, and are capable of printing color images with ease, they are now widely used at home to output digital information. Inkjet technologies have been appealing in commercial and industrial as well as home settings.

In commercial and industrial settings, substrates such as soft packaging substrates, plastic film, and fabric are used. Demand for printed matter with high image quality even on these substrates by inkjet printing is increasing.

Magenta ink for use in inkjet printing is mostly quinacridone pigments such as Pigment Red 122. However, quinacridone pigments are inferior in coloring while they have excellent durability. For this reason, naphthol red pigments such as Pigment Red 269 are appealing because of their good coloring.

SUMMARY

According to embodiments of the present disclosure, an ink is provided which contains water, Pigment Red 269, a compound represented by the following Chemical formula (1), and at least one of a silicone compound and an acetylene glycol compound, where the proportion of the compound represented by the following Chemical formula (1) to the Pigment Red 269 is 2.0 percent by mass or less:

(1)

BRIEF DESCRIPTION OF THE SEVERAL VIEWS OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF THE EMBODIMENTS

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the plural forms as well, unless the context clearly indicates otherwise.

Moreover, image forming, recording, printing, modeling, etc., in the present disclosure represent the same meaning, unless otherwise specified.

Embodiments of the present invention are described in detail below with reference to accompanying drawing(s). In describing embodiments illustrated in the drawing(s), specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

The ink of the present disclosure is excellent to enhance discharging reliability.

Ink

The ink of the present embodiment contains water, Pigment Red 269, the compound represented by Chemical Formula (1), at least one of a silicone compound or acetylene glycol compound, and other optional components such as an organic solvent, resin, and other additives.

The ink of the present embodiment is preferably a magenta ink. Magenta means color recognized as magenta in normal social conventions. It is preferably a color having a luminosity (L*) of from 40 to 70, a saturation (C*) of from 60 to 100, and a hue angle of from 320° to 360° or from 0° to 10° on gloss paper in the L*a*b* color coordinate system. Magenta ink can represent the color of magenta on its own.

Pigment Red 269

The ink of the present embodiment contains PR269 as coloring material. PR269 as coloring material enhances the coloring property of images formed with the ink. PR269 is represented by the following Chemical Formula (2)

N-(5-chloro-2-methoxyphenyl)-3-hydroxy-2-naphthalene carboxyamide and also referred to as naphthol AS-CA.

The proportion of the content of the compound represented by the Chemical Formula (1) to the mass of PR269 in the ink is 2.0 percent by mass or less, preferably 1.7 percent by mass or less, more preferably 1.5 percent by mass or less, furthermore preferably 1.0 percent by mass or less, and particularly preferably 0.6 percent by mass or less. The proportion is preferably 0.1 percent by mass or more. Since the ink contains the compound represented by the Chemical Formula (1) and the proportion of the content of the compound represented by the Chemical Formula (1) to the mass of PR269 is 2.0 percent by mass or less, dispersibility of PR269 in the ink is enhanced so that non-discharging and discharging disturbance of the ink by inkjetting are minimized, thereby achieving a high level of discharging reliability.

It is to be noted that a pigment containing procured PR269 and synthetic PR269 obtained by a known synthesis method contain the compound represented by the Chemical Formula (1). However, the proportion of the content of the compound represented by the Chemical Formula (1) to the mass of PR269 is not less than 2.0 percent by mass but normally around 10 percent by mass. This is because the material that reacts with the compound represented by the Chemical Formula (1) in the manufacturing of PR269 is carcinogenic so that the compound represented by the Chemical Formula (1) is excessively added in order to purge the pigment containing PR269 of the material. An ink prepared using a pigment containing procured PR269 or synthetic PR269 obtained by a known synthesis method does not satisfy the configuration of the ink of the present disclosure.

The compound represented by the Chemical Formula (1) is skin sensitizing potential. It is preferable that images formed with ink be not skin sensitizing potential. In the case of the ink of the present disclosure, skin sensitizing potential is reduced because the proportion of the content of the compound represented by the Chemical Formula (1) to the mass of PR269 is small, i.e., 2.0 percent by mass or less. Owing to this ink configuration, the ink of the present disclosure can be suitably used for substrates such as fabric for use in shirts or soft packaging substrates for use in food packaging which may directly contact skin. The proportion of the content of the compound represented by the Chemical Formula (1) to the mass of PR269 in the ink is more preferably 1.7 percent by mass or less to minimize skin sensitizing potential.

The method of adjusting the proportion of the content of the compound represented by the Chemical Formula (1) to the mass of PR269 in the ink to 2.0 percent by mass or less is not particularly limited. One way of adjusting the proportion is to add the compound represented by the Chemical Formula (1) during ink preparation, another is to adjust the content of the compound represented by the Chemical Formula (1) used during synthesis of PR269, and another is The proportion of the content of PR269 in the mass of the ink is preferably from 3.0 to 7.0 percent by mass and more preferably 3.5 to 6.0 percent by mass to enhance storage stability.

The type of the coloring materials for use in the ink is not particularly limited as long as it contains PR269. It is possible to contain a magenta coloring material other than PR269 and a coloring material demonstrating color other than magenta. The coloring material other than PR269 includes dyes as well as pigments.

Synthesis and Purification

PR269 can be synthesized or procured. Pigments can be synthesized using any known synthesis method including the following.

First, 3-amino-4-methoxy benzanilide is diazotized using sodium nitrite to prepare diazotized liquid. This diazotized liquid is mixed with a separately prepared reacting liquid containing naphthol AS-CA (represented by Chemical Formula (1)) as a coupling component to achieve coupling and thereby produce PR269.

Subsequent to filtering the mixture containing the synthetic PR269, the residue is rinsed with water followed by dehydration to obtain a press cake. The dry block obtained by drying the press cake is pulverized to obtain powdered PR269.

The resulting PR269 is purified by any known purification method. Such known purification methods include a method of removing impurities by repeatedly stirring and filtering with pure water, a method of purifying by diafiltration using an ultrafiltration membrane, and a purification method that uses a soxhlet extractor. The remaining components of the materials for synthesis of naphthol AS-CA can be removed or reduced by these methods.

Dispersion Method

A method of dispersing pigments covered with resin and a method of dispersion using a dispersant are suitable to obtain ink by dispersing pigments such as PR269.

One way of dispersing pigments covered with resin is to encapsulate pigments in microcapsules to make it disperse in water. This can be referred to as a resin-coated pigment. In this case, all the pigments added to ink are not necessarily entirely coated with resin; pigments never or partially coated with resin may be dispersed in the ink.

When a dispersant is used, a known dispersant having a small or large molecular weight, represented by a surfactant, is used. Those can be used alone or in combination.

Compound Represented by Chemical Formula (1)

The ink of the present embodiment contains the compound represented by the following Chemical formula (1). The compound represented by Chemical Formula (1) is an to adjust the purification method and the number of repeating purification in the purification process after synthesis of PR269.

The proportion of the content of the compound represented by the Chemical Formula (1) to the mass of the ink is 0.1 percent by mass or less, preferably 0.07 percent by mass or less, more preferably 0.06 percent by mass or less, furthermore preferably 0.05 percent by mass or less, particularly preferably 0.04 percent by mass or less, and more particularly preferably 0.03 percent by mass or less. The proportion is preferably 0.001 percent by mass or more. Since the ink contains the compound represented by the Chemical Formula (1) and the proportion of the content of the compound represented by the Chemical Formula (1) to the mass of the ink is 0.1 percent by mass or less, dispersibility of PR269 in the ink is enhanced so that non-discharging and discharging disturbance of the ink discharged by inkjetting are minimized, thereby achieving a high level of discharging reliability.

Silicone Compound and Acetylene Glycol Compound

The ink of the present embodiment contains at least one of a silicone compound and an acetylene glycol compound. Usage of at least one of a silicone compound and an acetylene glycol compound enhances dispersibility of PR269 in the ink so that non-discharging and discharging disturbance of the ink discharged by inkjetting are minimized, thereby achieving a high level of discharging reliability. This mechanism is not clear but it is inferred that, when the ink contains at least one of a silicone compound and an acetylene glycol compound under the condition that the proportion of the content of the compound represented by the Chemical Formula (1) to the mass of PR269 in the ink is 2.0 percent by mass or less, at least one of a silicone compound and an acetylene glycol compound can be suitably oriented to the surface of PR269.

Use of at least one of a silicone compound and an acetylene glycol compound enhances wettability of the ink to a substrate, which improves the degree of filling in ink dots in a solid image and reduces occurrence of beading (image unevenness). It is effective to use the ink of the present disclosure for a substrate on which the ink does not readily spread; it is preferable to apply the ink to a substrate with little or low ink absorption property and more preferable to a soft packaging substrate or plastic film. The ink of the present disclosure is suitably used for a substrate for use in a case in which ink is required to spread; it is preferable to apply the ink to a substrate with a large surface roughness and high level of ink absorption property and more preferable to fabric or corrugated board.

The silicone compound and the acetylene glycol compound are preferably a silicone-based surfactant and an acetylene glycol-based surfactant.

The silicone compound includes an organosiloxane structure in its molecule structure. The silicone compound is preferably a polyether-modified silicone compound. The polyether-modified silicone compound is classified into: the side chain type (pendant type) in which a polyether group is introduced into the side chain of polysiloxane; the one terminal type in which a polyether group is introduced into one end of polysiloxane; the both end terminal type (ABA type) in which a polyether group is introduced into both ends of polysiloxane; the side chain and both end terminal type in which a polyether group is introduced into the side chain and both ends of polysiloxane; ABn type in which polysiloxane (A) in which a polyether group is introduced and polysiloxane (B) in which no polysiloxane is introduced are repeatedly bonded; and the branch type in which a polyether group is introduced into the ends of branched polysiloxane. Of these, the side chain type (pendant type) having a structure in which a polyether group is introduced into the side chain of polysiloxane is preferable.

Specific examples of procurable silicone compounds include, but are not limited to, KF-351A, KF-3512, KF-353, KF-354L, KF-355A, KF-615A, KF-945, KF-618, KF-6011, KF-6015, and KF-6004 (all manufactured by Shin-Etsu Chemical Co., Ltd.), SF-3771, SF-8427, SF-8428, SH-3749, SH-8400, FZ-2101, FZ-2104, FZ-2118, FZ-2203, FZ-2207, and L-7604 (all manufactured by Dow Corning Toray Co., Ltd.), BYK-345, BYK-346, and BYK-348 (all manufactured by BYK Japan KK.).

The acetylene glycol compound preferably has a symmetric structure with an acetylene group centered with an alcohol-based hydroxyl group or its derivative on the right and left.

Specific examples include, but are not limited to, 2,5,8-11-tetramethyl-6-dodecyne-5,8-diol, 5,8-dimethyl-6-dodecyne-5,8-diol, 2,4,7,9-tetramethyl-5-decyne-4,7-diol, 4,7-dimethyl-5-decyne-4,7-diol, 2,3,6,7-tetramethyl-4-octyne-3,6-diol, 3,6-dimethyl-4-octyne-3,6-diol, 3,6-diethyl-4-octyne-3,6-diol, and 2,5-dimethyl-3-hexyne-2,5-diol. Specific examples of procurable acetylene glycol compound include, but are not limited to, Surfynol 82 and 104, and DF-110 (all manufactured by Nissin Chemical Co., Ltd.)

The acetylene glycol compound is preferably an adduct of acetylene glycol with ethylene oxide. Dispersibility of PR269 in the ink is enhanced when the acetylene glycol compound is an adduct of acetylene glycol with ethylene oxide. As a result, non-discharging and discharging disturbance of the ink discharged by inkjetting are minimized, thereby achieving a high level of discharging reliability. Such acetylene glycol enhances storage stability of the ink. This is because such an adduct of acetylene glycol with an ethylene oxide enhances hydrophilicity of the acetylene glycol, which is thought to stabilize PR269 in an aqueous medium.

Specific examples of the adduct of acetylene glycol with an ethylene oxide include, but are not limited to, adducts of the specific compounds of the acetylene glycol mentioned above with a ethylene oxide.

Specific examples of procurable adducts of acetylene glycol with ethylene oxide include, but are not limited to, OLFINE® E1004, E1010, and E4300 and Surfynol 485 (all manufactured by Nissin Chemical co., ltd.)

The proportion of the content of at least one of a silicone compound and an acetylene glycol compound to the mass of the ink is preferably from 0.1 to 2.1 percent by mass and more preferably from 0.5 to 1.5 percent by mass. A proportion of the content of from 0.1 to 2.1 percent by mass enhances wettability of the ink to a substrate, which improves the degree of filling in ink dots in a solid image and reduces occurrence of beading (image unevenness). It is effective to use the ink of the present disclosure for a substrate on which the ink does not readily spread; it is preferable to apply the ink to a substrate with little or low ink absorption property and more preferable to a soft packaging substrate or plastic film. The ink of the present disclosure is suitably used for a substrate for use in a case in which ink is required to spread; it is preferable to apply the ink to a substrate with a large surface roughness and high level of ink absorption property and more preferable to fabric or corrugated board. A proportion of the content of from 0.1 to 2.1 percent by mass enhances dispersibility of PR269 in the ink so that non-discharging and discharging disturbance of the ink discharged by inkjetting are minimized, thereby achieving a high level of discharging reliability.

If the ink contains both of a silicone compound and an acetylene glycol compound, the content of at least one of a silicone compound and an acetylene glycol compound means the total content of the silicone compound and the acetylene glycol compound.

The type of the surfactant for use in the ink is not particularly limited as long as the ink contains at least one of a silicone compound and an acetylene glycol compound and may include a surfactant such as a fluorochemical surfactant.

Water

The ink of the present embodiment contains water. The proportion of water in the ink is not particularly limited and can be suitably selected to suit to a particular application. The proportion is preferably from 10.0 to 90.0 percent by mass and more preferably from 20.0 to 60.0 percent by mass of the mass of the ink to enhance the drying property and discharging reliability of the ink.

Organic Solvent

The ink of the present embodiment may contain a resin. The organic solvent is not particularly limited and water-soluble organic solvents can be used. Examples include, but are not limited to, polyhydric alcohols, ethers such as polyhydric alcohol alkylethers and polyhydric alcohol arylethers, nitrogen-containing heterocyclic compounds, amides, amines, and sulfur-containing compounds.

Specific examples of the water-soluble organic solvent include, but are not limited to: polyhydric alcohols such as ethylene glycol, diethylene glycol, 1,2-propanediol, 1,3-propanediol, 1,2-butanediol, 1,3-butanediol, 1,4-butanediol, 2,3-butanediol, 3-methyl-1,3-butane diol, triethylene glycol, polyethylene glycol, polypropylene glycol, 1,2-pentanediol, 1,3-pentanediol, 1,4-pentanediol, 2,4-pentanediol, 1,5-pentanediol, 1,2-hexanediol, 1,6-hexanediol, 1,3-hexanediol, 2,5-hexanediol, 1,5-hexanediol, glycerin, 1,2,6-hexanetriol, 2-ethyl-1,3-hexanediol, ethyl-1,2,4-butane triol, 1,2,3-butanetriol, 2,2,4-trimethyl-1,3-pentanediol, and petriol; polyol alkyl ethers such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether; polyol aryl ethers such as ethylene glycol monophenyl ether and ethylene glycol monobenzyl ether; nitrogen-containing heterocyclic compounds such as 2-pyrrolidone, N-methyl-2-pyrrolidone, N-hydroxyethyl-2-pyrrolidone, 1,3-dimethyl-2-imidazolidinone, ε-caprolactam, and γ-butyrolactone; amides such as formamide, N-methylformamide, N,N-dimethylformamide, 3-methoxy-N,N-dimethyl propioneamide, and 3-buthoxy-N,N-dimethyl propioneamide; amines such as monoethanolamine, diethanolamine, and triethylamine; sulfur-containing compounds such as dimethyl sulfoxide, sulfolane, and thiodiethanol; propylene carbonate, and ethylene carbonate. It is preferable to use an organic solvent having a boiling point of 250 or lower degrees C., which serves as a humectant and imparts a good drying property at the same time.

Of these organic solvents, containing a polyhydric alcohol is preferable. It is more preferable to contain at least one of 1,2-propane diol, 1,2-butane diol, and 2,3-butane diol. Containing these organic solvents enhances discharging stability of inkjet heads when the ink is inkjetted.

The proportion of the organic solvent in the ink has no particular limit and can be suitably selected to suit to a particular application.

The proportion in the total content of the ink is preferably from 10 to 60 percent by mass and more preferably from 20 to 60 percent by mass to enhance drying property and discharging reliability of the ink.

Resin

The ink of the present embodiment may contain a resin. Compatibility between PR269 and the resin in the ink of the present embodiment is improved owing to the resin. PR269 does not excessively permeate the inside of a substrate such as fabric or corrugated board, which has a large surface roughness and a high level of ink absorption property, and can stay on the surface of the substrate owing to this compatibility. The image density and the saturation are improved.

The type of the resin is not particularly limited and can be suitably selected to suit to a particular application. Examples include, but are not limited to, urethane resins, polyester resins, acrylic-based resins, vinyl acetate-based resins, styrene-based resins, butadiene-based resins, styrene-butadiene-based resins, vinyl chloride-based resins, acrylic styrene-based resins, and acrylic silicone-based resins. Of these, acrylic resins are preferable.

Resin particles formed of these resins may be used. It is possible to mix a resin emulsion in which such resin particles are dispersed in water as a dispersion medium with materials such as a coloring material and an organic solvent to obtain an ink. It is possible to use suitably-synthesized resin particles as the resin particle. Alternatively, the resin particle is procurable. The resin particle can be used alone or two or more type of the resin particles can be used in combination. Inclusion of resin particles in the ink enhances the fastness of images formed with the ink.

The volume average particle diameter (mean volume diameter) of the resin particle is not particularly limited and can be suitably selected to suit to a particular application. The mean volume diameter is preferably from 10 to 1,000 nm, more preferably from 10 to 200 nm, and particularly preferably from 10 to 100 nm to achieve good fixability and image robustness.

The mean volume diameter can be measured by using an instrument such as a particle size analyzer (Nanotrac Wave-UT151, manufactured by MicrotracBEL Corp.).

The proportion of the content of the resin is not particularly limited and can be suitably selected to suit to a particular application. It is preferably from 1 to 30 percent by mass and more preferably from 5 to 20 percent by mass of the total mass of the ink to secure fixability and storage stability of the ink.

Other Additives

Ink may further optionally include components such as a defoaming agent, a preservative and fungicide, a corrosion inhibitor, and a pH regulator.

Property of Ink

Properties of the ink are not particularly limited and can be suitably selected to suit to a particular application. For example, viscosity, surface tension, and pH are preferable in the following ranges.

The ink preferably has a viscosity of from 5 to 30 mPa·s and more preferably from 5 to 25 mPa·s at 25 degrees C. to enhance print density and text quality and achieve a good dischargeability. Viscosity can be measured by equipment such as a rotatory viscometer (RE-80L, manufactured by TOKI SANGYO CO., LTD.). The measuring conditions are as follows:

Standard cone rotor (1°34'×R24)
Sample liquid amount: 1.2 mL
Rate of rotation: 50 rotations per minute (rpm)

25 degrees C.

Measuring time: three minutes.

The surface tension of the ink is preferably 35 mN/m or less and more preferably 32 mN/m or less at 25 degrees C. to suitably level the ink on a substrate and make the drying time of the ink short.

pH of the ink is preferably from 7 to 12 and more preferably from 8 to 11 to prevent corrosion of metal material in contact with liquid.

Ink Set

A combination of the ink of the present embodiment and a processing fluid may be used as an ink set. The processing fluid contains an flocculant that aggregates components contained in the ink. The components contained in the ink include the coloring material in the ink. The image density of an image formed with the ink can be enhanced owing to this aggregation.

When the ink is applied to a substrate with a large surface roughness and high level of ink absorption property such as fabric or corrugated board, it is preferable to apply a processing fluid to the substrate before the ink is applied. Owing to the processing fluid, the image density and saturation can be enhanced. If the processing fluid is dried before the ink is applied, the image density and saturation are more enhanced.

Substrate

The substrate is not particularly limited and include, but are not limited to, plain paper, gloss paper, special paper, corrugated board, fabric, soft packaging substrate, and plastic film. Of these, it is preferable to use corrugated board, fabric, soft packaging substrate, and plastic film.

Fabric means a form made by changing fiber into fabric or textile, knitted work, and non-woven fabric. Fiber means vegetable fibers such as cotton and hemp, animal fiber such as silk and wool, synthetic fibers such as polyester, acetate, triacetate, polyamide, and polyurethane, biodegradable fiber such as polylactic acid, and mixed fiber of these.

The soft packaging substrate is preferably flexible enough to reel the substrate in a roll form. The material constituting the soft packaging substrate include, but are not limited to, paper, plastic film, metal deposition film, and metal foil of copper and aluminum. The plastic film contained in the soft packaging substrate is formed of organic resin polymers. It includes a biaxial oriented film prepared by melting and extruding the resin, extending the molten resin in the longitudinal direction and/or axial direction followed by heat fixing and cooling and a non-expanded film prepared by melting and extruding the resin followed by heat fixing and cooling without extension. Not all of the plastic film makes a soft packaging substrate. Only the flexible plastic film can be used for the soft packaging substrate.

The corrugated board is preferably a structure made by attaching both of the front and the back side of wavy paper to paper sandwiching the wavy paper to enhance the strength. The corrugated board includes an item processed to have a multi-layered structure and a half-side corrugated board with a wavy form exposed to the surface.

Printing Device and Printing Method

The ink of the present embodiment can be suitably applied to various printing devices employing an inkjet printing method, such as printers, facsimile machines, photocopiers, multifunction peripherals (serving as a printer, a facsimile machine, and a photocopier), and solid freeform fabrication devices such as 3D printers.

The printing device and the printing method respectively represent a device capable of discharging liquids such as ink and processing fluids to a substrate and a method of printing utilizing the device. The substrate means an item to which ink or various processing fluids can be temporarily or permanently attached.

The printing device may further optionally include a device relating to feeding, conveying, and ejecting a substrate and other devices referred to as a pre-processing device, a post-processing device in addition to the head portion for discharging the ink such as an ink applying device.

The printing device and the printing method may further optionally include a heating device (heater) for use in the heating process and a drying device (drier) for use in the drying process. The heating device and the drying device heat and dry the print surface and the opposite surface of a substrate. The heating device and the drying device are not particularly limited and include, but are not limited to, devices utilizing heated-wind heating, radiant heating, conductive heating, high frequency drying, and microwave drying. It is possible to heat and dry a substrate before, during, and after printing.

It is preferable to determine the level of drying depending on the heat shrinking property, thickness, and material of substrate.

The heating device and the drying device preferably have at least one device selected from heated-wind drying and IR drying.

In addition, the printing device and the printing method are not limited to those producing meaningful visible images such as text and figures with the ink. For example, the printing method and the printing device capable of producing patterns like geometric design and 3D images are included.

In addition, the printing device includes both a serial type device in which the liquid discharging head moves and a line type device in which the liquid discharging head is not moved, unless otherwise specified.

Furthermore, in addition to the desktop type, the printing device includes a device capable of printing images on a wide substrate having, for example, A0 size and a continuous printer capable of using continuous paper rolled in a roll-like form as a substrate.

Figure 1:
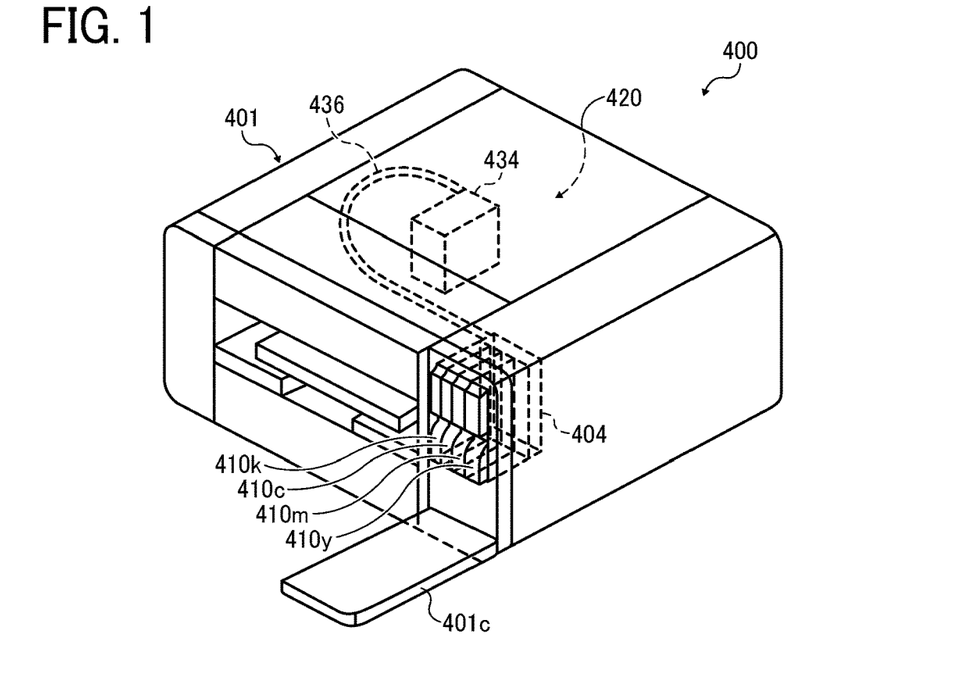
FIG. 1 is a diagram illustrating a perspective view of an example of a printing device.
Figure 2:
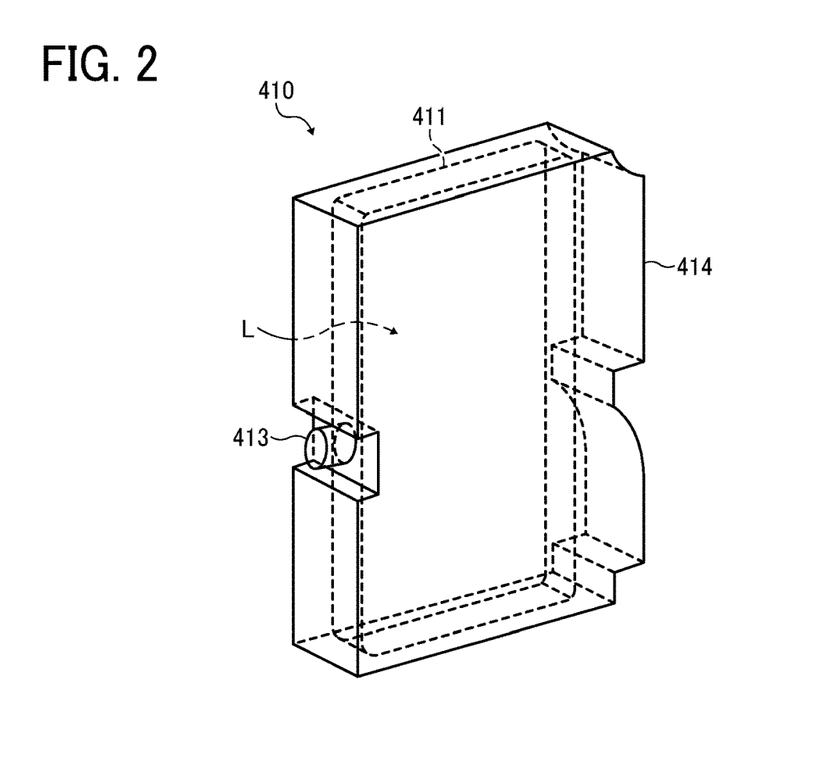
FIG. 2 is a diagram illustrating a perspective view of an example of a tank.

The printing device is described using an example with reference to FIG. 1 and FIG. 2. FIG. 1 is a diagram illustrating a perspective view of the printing device. FIG. 2 is a diagram illustrating a perspective view of a tank. An image forming device 400, which is an embodiment of the printing device, is a serial type image forming device. A mechanical assembly 420 is disposed in an exterior 401 of the image forming device 400. Each ink container 411 of each tank (i.e., ink accommodating unit) 410 (410*k*, 410*c*, 410*m*, and 410*y*) for each color of black (K), cyan (C), magenta (M), and yellow (Y) is made of, for example, a packaging member such as aluminum laminate film. The ink container 411 is housed in, for example, a plastic container housing unit 414 and L represents liquid contained in the ink container 411. As a result, the tank 410 is used as an ink cartridge of each color.

A cartridge holder 404 is disposed on the rear side of the opening formed when a cover 401*c* is opened. The cartridge holder 404 is detachably attached to the tank 410. This enables each ink outlet 413 of the tank 410 to communicate with a discharging head 434 for each color via a supplying tube 436 for each color so as to discharge the ink from a discharging head 434 to a substrate.

Notably, the ink is applicable not only to the inkjet printing but can be widely applied in other methods.

Specific examples of such methods other than the inkjet printing include, but are not limited to, blade coating methods, gravure coating methods, bar coating methods, roll coating methods, dip coating methods, curtain coating methods, slide coating methods, die coating methods, and spray coating methods.

Having generally described preferred embodiments of this disclosure, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, the present disclosure is described in detail with reference to Examples but is not limited thereto. In Examples, parts means parts by mass and percent means percent by mass excluding those in the evaluation criteria.

Manufacturing of PR269

A total of 12.5 parts of HCL aqueous solution at 35 percent was added to 187.5 parts of iced water followed by stirring and the temperature was adjusted to 5 degrees C. or lower. Moreover, 8.0 parts of 3-amino-4-methoxybenzanilide was added followed by stirring. After 3-amino-4-methoxybenzanilide was dissolved and hydrochloride of 3-amino-4-methoxybenzanilide was precipitated, the resulting mixture was stirred at 5 or lower degrees C. for 30 minutes. Thereafter, 7.8 parts of an aqueous solution of sodium nitrite at 30.0 percent was added followed by stirring at 5 or lower degrees C. for 60 minutes. Moreover, 0.3 parts of sulfamic acid was added to remove nitrous acid. Moreover, 8.0 parts of sodium acetate and 12.0 parts of acetic acid at 90 percent were added so that a cooled solution of diazonium salt was obtained.

In addition, separately, 12.0 parts of N-(5-chloro-2-methoxyphenyl)-3-hydroxy-2-naphthalene carboxyamide (compound represented by the Chemical Formula (1) were weighed and subsequently, 150.0 parts of pure water and 4.0 parts of sodium hydroxide were added thereto. During the stirring, the resulting mixture was heated to 90 degrees C. to obtain a solution. The resulting solution was further stirred and cooled down to 5 degrees C. to obtain a naphthol cooling solution.

The diazonium salt cooled solution was poured into a syringe pump equipped with a 0.5 mm syringe and injected to the naphthol cooling solution at a rate of 15 parts/minute under stirring at 10 or lower degrees C. followed by vigorous stirring at 1,200 rpm at 5 or lower degrees C. for one hour. Thereafter, the mixed solution was heated to 90 degrees C. and subjected to vigorous stirring at 90 degrees C. at 1,200 rpm for one hour. Moreover, pH of the resulting solution was adjusted to 6.0 using an aqueous solution of 1N hydrochloric acid or 1N sodium hydroxide followed by filtering and rinsing with water, which was dried at 80 degrees C. for 10 hours. The dried material was pulverized, thereby obtaining C.I. Pigment Red 269.

Manufacturing Examples PR269-A to -G

The thus-obtained PR269 was rinsed with water and dried to obtain pigments of PR269-A to -G shown in the following Table 1. The proportion (percent by mass) of the compound represented by the Chemical Formula (1) to the PR269 in PR269-A to -G was adjusted by changing the number of rinsing.

TABLE 1

| | Chemical Formula 1/ PR269 |
|---|---|
| PR269-A | 1.0 percent by mass |
| PR269-B | 2.0 percent by mass |
| PR269-C | 1.5 percent by mass |
| PR269-D | 1.7 percent by mass |
| PR269-E | 2.2 percent by mass |
| PR269-F | 2.7 percent by mass |
| PR269-G | 0.6 percent by mass |

The proportion of the compound represented by the Chemical Formula (1) in PR269-A to -G was measured in the following manner.

Each sample (0.5 g) was dried and mixed with N-methyl pyrrolidone at 10 mL. The resulting mixture was pulverized by ultrasonic wave for 15 minutes. Thereafter, 20 ml of methanol was added followed by the pulverization for another 15 minutes followed by filtering the resulting suspension. The filtered liquid at 20 μl was introduced into an autosampler of HPLC system. The amount of the compound represented by the Chemical Formula (1) was calculated by comparing the peak area of the sample with the calibration curve drawn using the reference substance of the compound represented by the Chemical Formula (1).

The measuring conditions of the HPCL system were as follows.

Instrument used: LC-20000 Plus, manufactured by JASCO Corporation

Column: Triart-C18, 4.6×100 mm

Eluent: aqueous solution of ammonium acetate/methanol

Rate of flowing: 1.0 ml/minute

Column temperature: 50 degrees C.

Detector: photodiode array (PDA)

Preparation of PR269 Liquid Dispersion

Preparation Example of PR269 Liquid Dispersion A

The following recipe was pre-mixed, which was thereafter subjected to circulation dispersion for 7 hours by a disk type bead mill (KDL type, media: zirconia ball having a diameter of 0.3 mm, manufactured by SHINNIARU ENTERPRISES CORPORATION) so that a PR269 liquid dispersion A (concentration of pigment solid content: 15.0 percent by mass) was obtained.

PR269-A: 15.0 parts

Anionic surfactant (Pionine A-51-B, manufactured by TAKEMOTO OIL & FAT CO., LTD.): 2.0 parts Deionized water: 83.0 parts Preparation Example of PR269 Liquid Dispersion B to G PR269 liquid dispersions B to G (each having a pigment solid concentration of 15.0 percent by mass) were obtained in the same manner as the Preparation Example of PR269 Liquid Dispersion A except that PR269-B to -G were used instead of PR269-A.

Preparation of Ink

Examples 1 to 10 and Comparative Examples 1 to 6

Each component was mixed and stirred in the amount (parts by mass) shown in Tables 2 and 3 below followed by filtering with 0.2 μm polypropylene filter to prepare inks of Examples 1 to 10 and Comparative Examples 1 to 6. In Tables 2 and 3 below, the figures of the content of the PR269 liquid dispersions A to G represent pigment solid contents and the figures of the content of the resin emulsion represent the solid contents of resin.

The total of each component in each ink in Tables 2 and 3 below is 100.0 parts by mass.

The following materials were used for each component in Tables 2 and 3 below.

Resin emulsion: Acrylic resin (ES-85, manufactured by Japan Coating Resin Co., Ltd.)

OLFINE® E1004, acetylene glycol compound as an adduct of acetylene glycol with ethylene oxide (manufactured by Nissin Chemical Industry Co., Ltd.)

SURFYNOL 82: acetylene glycol compound (manufactured by Nisshin Chemical Co., Ltd.)

NYK-345: silicone compound (manufactured by BYK-Chemie GmbH)

KF-353: silicone compound (manufactured by Shin-Etsu Chemical Co., Ltd.)

Zonyl FS-3100 (fluorochemical surfactant, manufactured by E.I. du Pont de Nemours and Company)

PF-136A: Fluorochemical surfactant (manufactured by OMNOVA-Chemie GmbH)

SOFTANOL EP-7025 (hydrocarbon-based surfactant (manufactured by NIPPON SHOKUBAI CO., LTD.)

PROXEL LV, preservatives and fungicides (manufactured by AVECTA GROUP)

TABLE 2

| | | Example | | | | |
|---|---|---|---|---|---|---|
| | | 1 | 2 | 3 | 4 | 5 |
| PR269 liquid dispersion | PR269 liquid dispersion A (solid content) | 5.0 | 5.0 | 5.0 | 5.0 | 5.0 |
| | PR269 liquid dispersion B (solid content) | | | | | |
| | PR269 liquid dispersion C (solid content) | | | | | |
| | PR269 liquid dispersion D (solid content) | | | | | |
| | PR269 liquid dispersion E (solid content) | | | | | |
| | PR269 liquid dispersion F (solid content) | | | | | |
| | PR269 liquid dispersion G (solid content) | | | | | |
| Resin | Resin emulsion (solid content) | 5.0 | 5.0 | 5.0 | 5.0 | 5.0 |
| Surfactant | OLFINE® E1004 | 1.0 | 0.7 | 0.1 | 2.1 | 2.4 |
| | Surfynol 82 | | | | | |
| | BYK-345 | | 0.3 | | | |
| | KF-353 | | | | | |
| | Zonyl FS-3100 | | | | | |
| | PF-136A | | | | | |
| | SOFTANOL EP-7025 | | | | | |
| Organic solvent | 1,2-propane diol | 20.0 | 20.0 | 20.0 | 20.0 | 20.0 |
| | Diethylene glycol monobutyl ether | 7.0 | 7.0 | 7.0 | 7.0 | 7.0 |
| Preservatives and fungicides | PROXEL LV | 0.1 | 0.1 | 0.1 | 0.1 | 0.1 |
| Water | Highly pure water | Balance | Balance | Balance | Balance | Balance |
| Total amount | | 100 | 100 | 100 | 100 | 100 |

TABLE 2-continued

| | | Example | | | | |
|---|---|---|---|---|---|---|
| | | 6 | 7 | 8 | 9 | 10 |
| PR269 liquid dispersion | PR269 liquid dispersion A (solid content) | 5.0 | 5.0 | 5.0 | 5.0 | |
| | PR269 liquid dispersion B (solid content) | | | | | |
| | PR269 liquid dispersion C (solid content) | | | | | |
| | PR269 liquid dispersion D (solid content) | | | | | |
| | PR269 liquid dispersion E (solid content) | | | | | |
| | PR269 liquid dispersion F (solid content) | | | | | |
| | PR269 liquid dispersion G (solid content) | | | | | |
| Resin | Resin emulsion (solid content) | 5.0 | 5.0 | 5.0 | 5.0 | 5.0 |
| Surfactant | OLFINE® E1004 | 0.01 | | | | |
| | Surfynol 82 | | 1.0 | 0.1 | 2.1 | 0.8 |
| | BYK-345 | | | | | |
| | KF-353 | | | | | |
| | Zonyl FS-3100 | | | | | |
| | PF-136A | | | | | |
| | SOFTANOL EP-7025 | | | | | |
| Organic solvent | 1,2-propane diol | 20.0 | 20.0 | 20.0 | 20.0 | 20.0 |
| | Diethylene glycol monobutyl ether | 7.0 | 7.0 | 7.0 | 7.0 | 7.0 |
| Preservatives and fungicides | PROXEL LV | 0.1 | 0.1 | 0.1 | 0.1 | 0.1 |
| Water | Highly pure water | Balance | Balance | Balance | Balance | Balance |
| Total amount | | 100 | 100 | 100 | 100 | 100 |

| | | Example | | | | | |
|---|---|---|---|---|---|---|---|
| | | 11 | 12 | 13 | 14 | 15 | 16 |
| PR269 liquid dispersion | PR269 liquid dispersion A (solid content) | 5.0 | | | | 5.0 | 5.0 |
| | PR269 liquid dispersion B (solid content) | | | | | | |
| | PR269 liquid dispersion C (solid content) | | | 4.0 | | | |
| | PR269 liquid dispersion D (solid content) | | | | 5.5 | | |
| | PR269 liquid dispersion E (solid content) | | | | | | |
| | PR269 liquid dispersion F (solid content) | | | | | | |
| | PR269 liquid dispersion G (solid content) | | 4.0 | | | | |
| Resin | Resin emulsion (solid content) | 5.0 | 7.0 | 7.0 | 6.0 | 5.0 | 5.0 |
| Surfactant | OLFINE® E1004 | | | | | | |
| | Surfynol 82 | | | | | | |
| | BYK-345 | 0.7 | 0.5 | 0.5 | | 0.1 | 2.1 |
| | KF-353 | | | | 1.5 | | |
| | Zonyl FS-3100 | | | | | | |
| | PF-136A | | | | | | |
| | SOFTANOL EP-7025 | | | | | | |
| Organic solvent | 1,2-propane diol | 20.0 | 20.0 | 20.0 | 20.0 | 20.0 | 20.0 |
| | Diethylene glycol monobutyl ether | 7.0 | 7.0 | 7.0 | 7.0 | 7.0 | 7.0 |
| Preservatives and fungicides | PROXEL LV | 0.1 | 0.1 | 0.1 | 0.1 | 0.1 | 0.1 |
| Water | Highly pure water | Balance | Balance | Balance | Balance | Balance | Balance |
| | Total amount | 100 | 100 | 100 | 100 | 100 | 100 |

TABLE 3

| | | Comparative Example | | | | | |
|---|---|---|---|---|---|---|---|
| | | 1 | 2 | 3 | 4 | 5 | 6 |
| PR269 liquid dispersion | PR269 liquid dispersion A (solid content) | | | 5.0 | 5.0 | 5.0 | 5.0 |
| | PR269 liquid dispersion B (solid content) | | | | | | |
| | PR269 liquid dispersion C (solid content) | | | | | | |
| | PR269 liquid dispersion D (solid content) | | | | | | |
| | PR269 liquid dispersion E (solid content) | 5.0 | | | | | |
| | PR269 liquid dispersion F (solid content) | | 5.0 | | | | |
| | PR269 liquid dispersion G (solid content) | | | | | | |
| Resin | Resin emulsion (solid content) | 5.0 | 5.0 | 5.0 | 5.0 | 5.0 | 5.0 |
| Surfactant | OLFINE® E1004 | 1.0 | 1.0 | | | | |
| | Surfynol 82 | | | | | | |
| | BYK-345 | | | | | | |
| | KF-353 | | | | | | |
| | Zonyl FS-3100 | | | | 1.0 | | |
| | PF-136A | | | | | 1.0 | |
| | SOFTANOL EP-7025 | | | | | | 1.0 |
| Organic solvent | 1,2-propane diol | 20.0 | 20.0 | 20.0 | 20.0 | 20.0 | 20.0 |
| | Diethylene glycol monobutyl ether | 20.0 | 20.0 | 20.0 | 20.0 | 20.0 | 20.0 |
| Preservatives and fungicides | PROXEL LV | 0.1 | 0.1 | 0.1 | 0.1 | 0.1 | 0.1 |
| Water | Highly pure water | Balance | Balance | Balance | Balance | Balance | Balance |
| | Total amount | 100 | 100 | 100 | 100 | 100 | 100 |

The thus-obtained ink was evaluated on discharging reliability, solid image filling property, and skin sensitization potential. The results are shown in Table 4.

Discharging Reliability

An inkjet printer (IPSiO Gxe5500, manufactured by Ricoh Co., Ltd.) filled with the manufactured ink was allowed to rest at 15 degrees C. and a relative humidity of 15 percent for one hour with the head decapped. Thereafter, a nozzle check pattern was printed with the inkjet printer to visually check whether or not non-discharging of disturbed discharging occurred and evaluated on discharging reliability according to the following evaluation criteria. Grade B or higher is preferable.

Evaluation Criteria

AAA: No non-discharging or disturbed discharging occurred since immediately after printing started AA: No non-discharging occurred since immediately after printing started but discharging disturbance slightly occurred only immediately after printing started A: No non-discharging occurred since immediately after printing started but discharging disturbance occurred B: No non-discharging occurred without causing no practical problems C: a small number of nozzles did not discharge ink, causing practical problems D: a large number of nozzles did not discharge ink, causing practical problems Solid Image Filling Property A solid patch was printed on a soft packaging substrate (biaxial oriented polypropylene film, PYLEN® P-2161, a thickness of 30 μm, manufactured by TOYOBO CO., LTD.) with an inkjet printer (IPSiO Gxe5500, manufactured by Ricoh Co., Ltd.) filled with the manufactured ink and dried at 80 degrees C. in an oven for two minutes. The printed portion was evaluated on solid image filling property by visual check according to the following evaluation criteria. Grade B or higher is preferable.

Evaluation Criteria

A: Uniform solid image was formed

B: 99 percent or more of the image was solid with very few omissions and beading C: Less than 99 percent of the image was solid with clear omissions and cracking Skin Sensitization Potential The SI value was calculated according to LLNA method, which was skin sensitizing potential evaluation in OECD test guide line 429 and evaluated on skin sensitizing potential according to the following evaluation criteria. Grade B or higher is preferable.

Evaluation Criteria

A: SI value is less than 1.8-fold.
B: SI value from 1.8-fold to less than 2.5-fold
C: SI value is not less than 2.5-fold

TABLE 4

|  |  | Chemical Formula 1/ PR269 | Evaluation result | | |
|---|---|---|---|---|---|
|  |  |  | Discharging reliability | Solid image filling property | Skin sensitization potential |
| Example | 1 | 1.0 percent by mass | AAA | A | A |
|  | 2 | 1.0 percent by mass | AA | A | A |
|  | 3 | 1.0 percent by mass | A | B | A |
|  | 4 | 1.0 percent by mass | B | A | A |
|  | 5 | 1.0 percent by mass | B | B | A |
|  | 6 | 1.0 percent by mass | B | B | A |
|  | 7 | 1.0 percent by mass | AA | A | A |
|  | 8 | 1.0 percent by mass | A | B | A |
|  | 9 | 1.0 percent by mass | B | A | A |
|  | 10 | 2.0 percent by mass | AA | A | B |
|  | 11 | 1.0 percent by mass | AA | A | A |
|  | 12 | 0.6 percent by mass | AAA | A | A |
|  | 13 | 1.5 percent by mass | AA | A | A |
|  | 14 | 1.7 percent by mass | AA | A | A |
|  | 15 | 1.0 percent by mass | A | B | A |
|  | 16 | 1.0 percent by mass | B | A | A |
| Comparative Example | 1 | 2.2 percent by mass | C | A | B |
|  | 2 | 2.7 percent by mass | D | A | C |
|  | 3 | 1.0 percent by mass | C | B | A |
|  | 4 | 1.0 percent by mass | D | B | A |
|  | 5 | 1.0 percent by mass | C | B | A |
|  | 6 | 1.0 percent by mass | C | C | A |

After the evaluation on solid image filing property, the soft packaging substrate (biaxial oriented polypropylene film, PYLEN® P-2161, thickness of 30 μm, manufactured by TOYOBO CO., LTD.) was folded repeatedly. All of the printing portions were free of image defects at the printing portions when the inks of Examples were used.

The solid patch was printed on the following substrate instead of the soft packaging substrate (biaxial oriented polypropylene film, PYLEN® P-2161, thickness of 30 μm, manufactured by TOYOBO CO., LTD.) and evaluated on the solid image filling property in the same manner. The printed portions printed on any of the substrates were graded B or above for the inks of Examples.

Transparent plastic film (PET, WPM-42, thickness of 215 μm, manufactured by LAMI CORPORATION INC.)

T-shirt

Corrugated board

The transparent plastic film is not included in the soft packaging substrate.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

What is claimed is:

1. An ink, comprising:
   water;
   Pigment Red 269;
   a compound represented by the following Chemical formula (1):

(1)

and
   at least one of a silicone compound and an acetylene glycol compound,
   where a proportion of the compound represented by the Chemical formula (1) to the Pigment Red 269 is 0.1 to 2.0 percent by mass.

2. The ink according to claim 1, wherein a proportion of the at least one of a silicone compound and an acetylene glycol compound in the ink is from 0.1 to 2.1 percent by mass.

3. The ink according to claim 1, comprising the acetylene glycol, wherein the acetylene glycol comprises an adduct of acetylene glycol with an ethylene oxide.

4. An ink accommodating unit, comprising:
   a container; and
   the ink of claim 1 contained in the container.

5. A printing device comprising:
   the ink accommodating container of claim 4; and
   an ink applying device configured to apply the ink in the ink accommodating container to a substrate.

6. A printing method comprising:
   applying the ink of claim 1 to a substrate.

7. The printing method according to claim 6, wherein the substrate comprises a soft packaging substrate.

8. The printing method according to claim 6, wherein the substrate comprises a plastic film.

9. The printing method according to claim 6, wherein the substrate comprises fabric.

10. The printing method according to claim 6, wherein the substrate comprises a corrugated board.

11. The ink according to claim 1, comprising the silicone compound, wherein the silicone compound comprises a polyether-modified silicone compound.

12. The ink according to claim 1, comprising the acetylene glycol compound.

13. The ink according to claim 1, comprising from 3.0 to 7.0 percent by mass of Pigment Red 269.

14. The ink according to claim 1, where a proportion of the compound represented by the Chemical formula (1) to the Pigment Red 269 is 0.1 to 1.5 percent.

15. The ink according to claim 1, where a proportion of the compound represented by the Chemical formula (1) to the Pigment Red 269 is 0.6 to 2.0 percent.

16. The ink according to claim 1, where a proportion of the compound represented by the Chemical formula (1) to the mass of the ink is 0.1 percent or less by mass of the ink.

17. The ink according to claim 1, where a proportion of the compound represented by the Chemical formula (1) to the mass of the ink is 0.001 to 0.1 percent by mass of the ink.

18. The ink according to claim 1, which further comprises an acrylic resin and an organic solvent comprising 1,2-propane diol or diethylene glycol monobutyl ether.

19. The ink according to claim 3, wherein a proportion of the content of the acetylene glycol compound to the mass of the ink is from 0.1 to 2.1 percent by mass.

* * * * *